(12) United States Patent
Martell et al.

(10) Patent No.: US 9,481,386 B2
(45) Date of Patent: Nov. 1, 2016

(54) MOBILE CART

(71) Applicant: Target Brands, Inc., Minneapolis, MN (US)

(72) Inventors: Timothy J. Martell, Brooklyn Park, MN (US); Jason W. Johnson, Wayzata, MN (US)

(73) Assignee: Target Brands, Inc., Minneapolis, MN (US)

( * ) Notice: Subject to any disclaimer, the term of this patent is extended or adjusted under 35 U.S.C. 154(b) by 105 days.

(21) Appl. No.: 14/525,495

(22) Filed: Oct. 28, 2014

(65) Prior Publication Data

US 2016/0113395 A1    Apr. 28, 2016

(51) Int. Cl.
| | | |
|---|---|---|
| *B62B 3/04* | (2006.01) | |
| *B62B 3/00* | (2006.01) | |
| *A47B 31/00* | (2006.01) | |
| *A47F 10/02* | (2006.01) | |

(52) U.S. Cl.
CPC ............... *B62B 3/00* (2013.01); *A47B 31/00* (2013.01); *A47F 10/02* (2013.01)

(58) Field of Classification Search
CPC .............................. B62B 3/002; B62B 3/003
USPC ............... 280/79.11, 79.3, 47.34, 47.35; 40/606.08, 600
See application file for complete search history.

(56) References Cited

U.S. PATENT DOCUMENTS

| | | | | |
|---|---|---|---|---|
| 1,571,098 A | * | 1/1926 | Rimke ................... | A47B 95/00 40/606.08 |
| 2,525,208 A | * | 10/1950 | Clink ...................... | B25H 1/12 206/373 |
| 3,966,286 A | * | 6/1976 | Groseclose ............ | A47B 43/00 312/209 |
| 4,081,205 A | * | 3/1978 | Rosenacker .......... | B62B 3/1408 280/33.992 |
| 4,652,062 A | * | 3/1987 | Greenwood ........... | A47B 31/00 280/47.35 |
| 4,820,003 A | * | 4/1989 | Lloyd .................... | A47B 31/00 312/234 |
| 5,183,372 A | * | 2/1993 | Dinverno ................ | B25H 3/00 14/71.1 |
| 5,489,106 A | * | 2/1996 | Engelking ......... | H01L 21/67724 280/47.35 |
| 5,551,773 A | * | 9/1996 | Cottrell ................... | B25H 1/04 242/129 |
| 5,611,553 A | * | 3/1997 | Schoeman ............. | A47B 46/00 280/47.35 |
| 5,626,353 A | | 5/1997 | Campbell | |
| 5,980,008 A | * | 11/1999 | Stoever ............... | B60B 33/0002 280/47.34 |
| 5,997,112 A | | 12/1999 | Karten et al. | |
| 6,024,427 A | * | 2/2000 | Underwood .......... | A47B 21/00 280/47.35 |
| 6,095,056 A | | 8/2000 | Schumacher | |

(Continued)

OTHER PUBLICATIONS

Office Action from Canadian Patent Application No. 2,877,633, mailed Jul. 10, 2015 (5 pages).

*Primary Examiner* — Jeffrey J Restifo
(74) *Attorney, Agent, or Firm* — Leanne Taveggia Farrell; Westman, Champlin & Koehler, P.A.

(57) ABSTRACT

A mobile cart includes a cabinet supported by a plurality of wheels, a countertop located on top of the cabinet, an upper trim assembly completely surrounding an upper portion of the cabinet and being spaced apart from the cabinet by a space, a lower trim assembly at least partially surrounding a lower portion of the cabinet and being spaced apart from the cabinet by a space and a marketing sign held to a front panel of the cabinet. The upper edge of the marketing sign is located in the space between a front member of the upper trim assembly and a front panel of the cabinet. The lower edge of the marketing sign is located in the space between a front member of the lower trim assembly and the front panel of the cabinet.

19 Claims, 10 Drawing Sheets

(56) References Cited

U.S. PATENT DOCUMENTS

| | | | |
|---|---|---|---|
| 6,279,822 B1 | 8/2001 | Bertram | |
| 6,393,748 B1 * | 5/2002 | Cooper | G09F 15/0056 248/165 |
| D466,722 S | 12/2002 | Milazzo | |
| 6,510,635 B1 * | 1/2003 | Rudolph | G09F 1/12 248/489 |
| 6,694,896 B1 * | 2/2004 | Milazzo | A47B 1/04 108/115 |
| 7,144,020 B2 * | 12/2006 | Huguet | A47B 95/043 280/47.34 |
| 7,195,155 B2 | 3/2007 | Garberg et al. | |
| 7,198,511 B2 * | 4/2007 | Brennan, Jr. | B25H 3/00 280/47.19 |
| 7,325,891 B1 * | 2/2008 | Kinsley | B62B 3/10 280/47.35 |
| 7,338,055 B2 * | 3/2008 | Fuentes | A61G 12/001 280/47.35 |
| 8,157,337 B2 * | 4/2012 | Manalang | B25H 3/06 211/70.6 |
| 8,162,330 B2 * | 4/2012 | Melkumyan | B25H 1/02 280/47.34 |
| 8,215,039 B2 * | 7/2012 | Watson | G06Q 30/02 297/256.17 |
| 8,613,456 B2 * | 12/2013 | Grela | B25H 3/028 280/79.2 |
| D703,904 S | 4/2014 | Knoll et al. | |
| 2003/0141687 A1 * | 7/2003 | Wixted | B62B 3/006 280/47.35 |
| 2003/0151217 A1 | 8/2003 | Trubiano | |
| 2004/0000766 A1 * | 1/2004 | Ekstein | B62B 3/004 280/47.34 |
| 2005/0001395 A1 * | 1/2005 | Fuentes | A61G 12/001 280/47.35 |
| 2005/0110373 A1 | 5/2005 | Assmann | |
| 2005/0127622 A1 | 6/2005 | Beyer | |
| 2005/0212239 A1 * | 9/2005 | Carter | A23L 3/001 280/47.35 |
| 2005/0242534 A1 * | 11/2005 | Woods | B62B 3/00 280/47.34 |
| 2010/0026151 A1 * | 2/2010 | Melkumyan | B25H 1/02 312/249.11 |
| 2014/0279119 A1 | 9/2014 | Knoll et al. | |
| 2015/0328768 A1 * | 11/2015 | Martin | B25H 3/003 312/237 |

* cited by examiner

MOBILE CART

BACKGROUND

Businesses often provide samples to customers free of cost so that the customer may try merchandise before committing to a purchase. For example, a free sample can be a portion of food or other product, such as beauty products, that are given to a customer in a shopping mall, a supermarket or other type of retail store. One way to distribute the free sample is from a cart that is located in customer traffic or other highly visible location.

The discussion above is merely provided for general background information and is not intended to be used as an aid in determining the scope of the claimed subject matter.

SUMMARY

A mobile cart advertises, displays and provides product samples to customers. The mobile cart includes a cabinet supported by a plurality of wheels, a countertop located on top of the cabinet, an upper trim assembly completely surrounding an upper portion of the cabinet and being spaced apart from the cabinet by a space, a lower trim assembly at least partially surrounding a lower portion of the cabinet and being spaced apart from the cabinet by a space and a marketing sign held to a front panel of the cabinet. The upper edge of the marketing sign is located in the space between a front member of the upper trim assembly and a front panel of the cabinet. The lower edge of the marketing sign is located in the space between a front member of the lower trim assembly and the front panel of the cabinet.

A mobile cart includes a housing with a front, a back, a bottom, a top, a first side and an opposing second side. A set of wheels are coupled to the bottom of the housing. A frame assembly surrounds an upper portion of the housing including upper portions of the front, the back, the first side and the opposing second side of the housing. An upper edge of the frame assembly is in alignment with a top surface of the top of the housing. The frame assembly includes a front member spaced apart from the front of the housing, a back member spaced apart from the back of the housing, a first side member spaced apart from the first side of the housing by a space and coupling the front member to the back member of the frame assembly and a second side member spaced apart from the second side of the housing by a space and coupling the front member to the back member of the frame assembly. The space between the first side member of the frame assembly and the first side of the housing is greater than the space between the second side member of the frame assembly and the second side of the housing. The first side member of the frame assembly comprises a handle for moving the mobile cart to a desired location.

A method of deploying a mobile cart includes attaching a marketing sign to a front panel of a cabinet that supports a countertop and is supported by a plurality of wheels. An upper edge of the marketing sign is located in a space between a front member of an upper trim assembly and the front panel of the cabinet and the lower edge of the marketing sign is located in a space between a front member of a lower trim assembly and the front panel of the cabinet. The method further includes moving the cabinet to a desired location in a retail store to serve product samples to customers using a side member of the upper trim assembly that is spaced apart from a side panel of the cabinet as a handle. The space between the side member of the upper trim assembly and the side panel of the cabinet is greater than the space between the front member of the upper trim assembly and the front panel of the cabinet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Described below is a mobile cart that can be moved to a desired location in a retail store or elsewhere and be used to advertise, display and provide product samples to customers as well as hold and store appliances and utensils for preparing and providing product samples. The mobile cart includes a cabinet supported on a plurality of wheels, a countertop mounted to a top of the cabinet, an upper trim assembly completely surrounding an upper portion of the cabinet and a lower trim assembly at least partially surrounding a lower portion of the cabinet.

The upper trim assembly includes four connected members spaced apart from the cabinet and the countertop. A first side member of the upper trim assembly is located on a first side of the cabinet and is spaced further apart from the cabinet and countertop than the remaining three members of the upper trim assembly to provide a handle for moving the mobile cart to the desired location. The lower trim assembly is also spaced apart from the cabinet. A marketing sign is held against a front of the cabinet and its upper and lower edges are hidden behind the upper trim assembly and the lower trim assembly.

Figure 1:
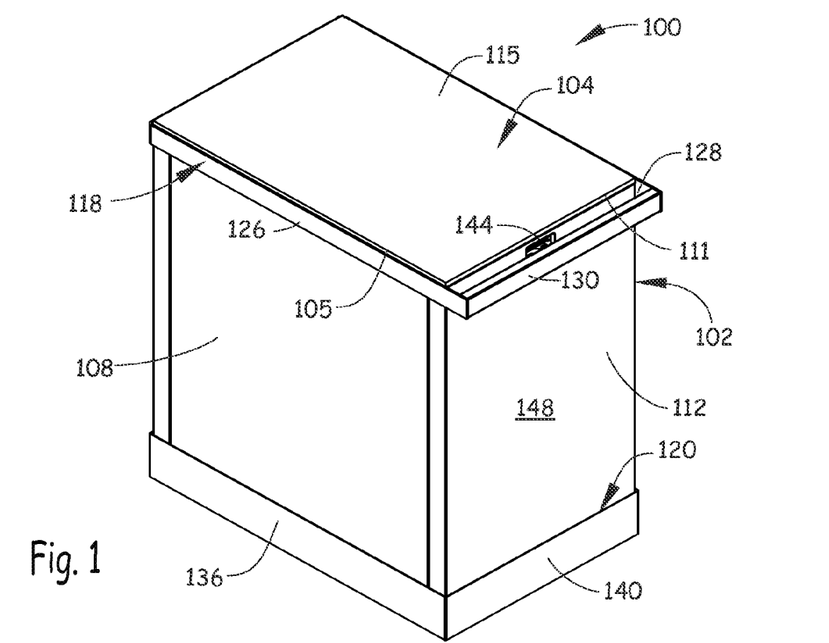
FIG. 1 is a front perspective view of a mobile cart according to one embodiment.
Figure 2:
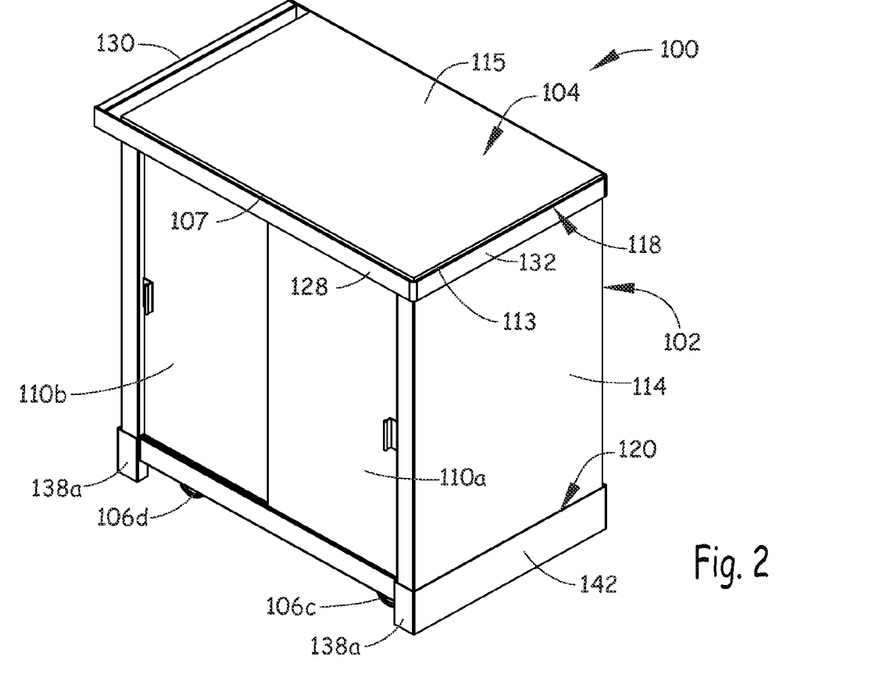
FIG. 2 is a back perspective view of the mobile cart illustrated in FIG. 1.
Figure 3:
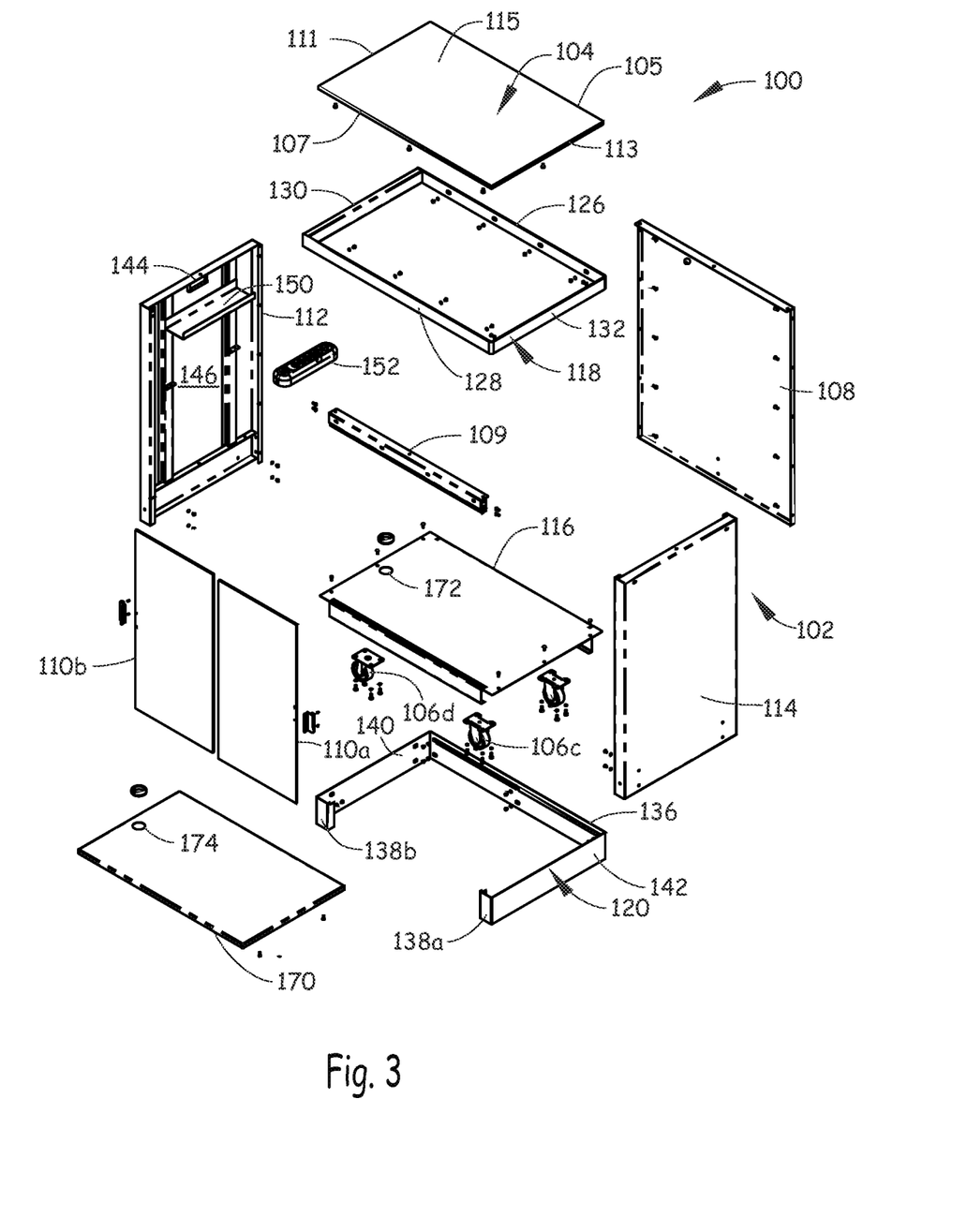
FIG. 3 is an exploded view of the mobile cart illustrated in FIG. 1.
Figure 4:
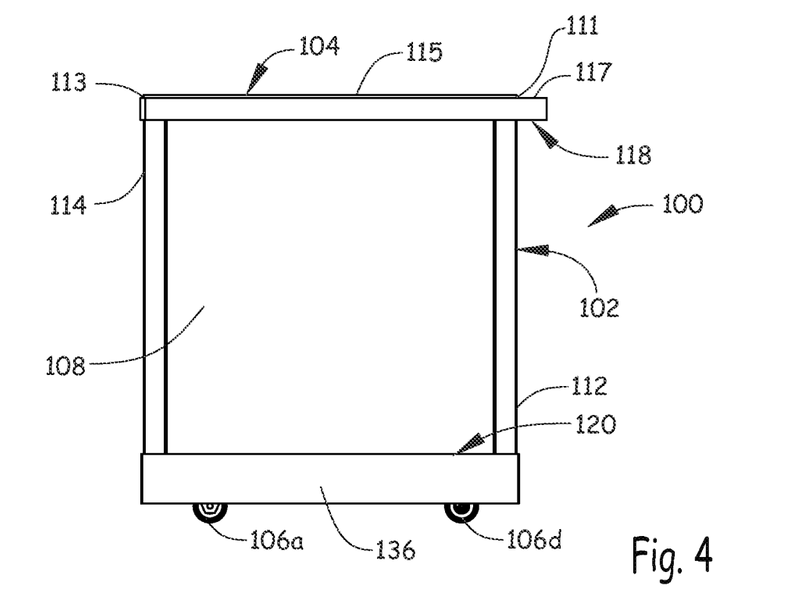
FIG. 4 is a front view of the mobile cart illustrated in FIG. 1.
Figure 5:
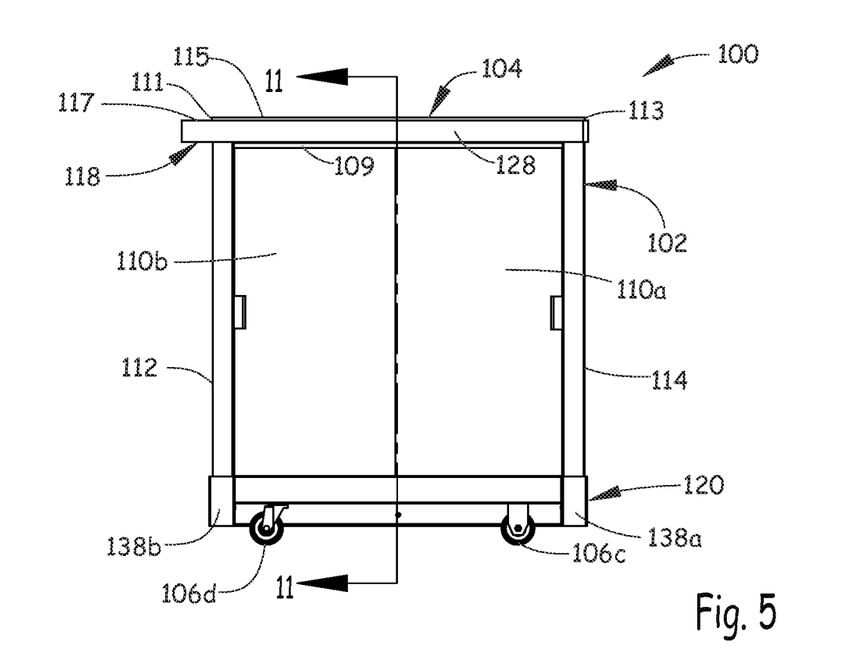
FIG. 5 is a back view of the mobile cart illustrated in FIG. 1.
Figure 6:
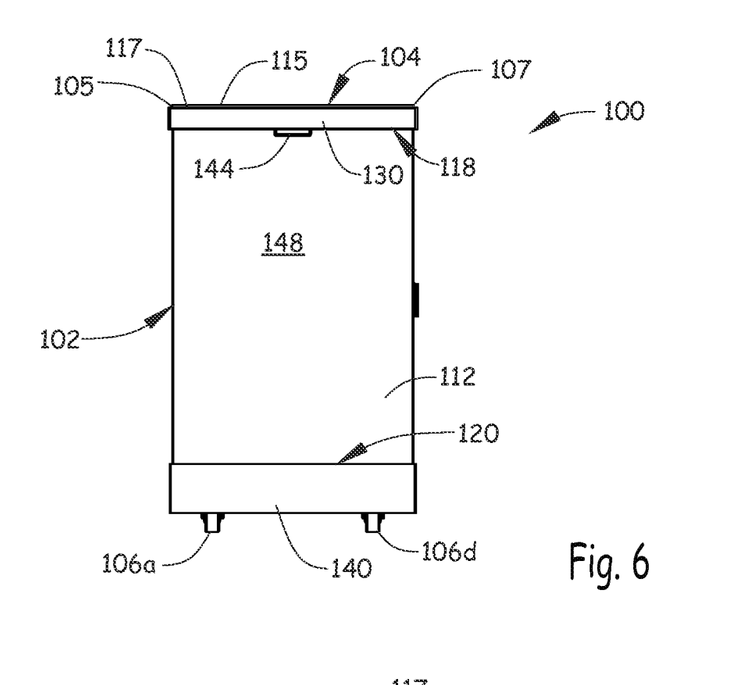
FIG. 6 is a right side view of the mobile cart illustrated in FIG. 1.
Figure 7:
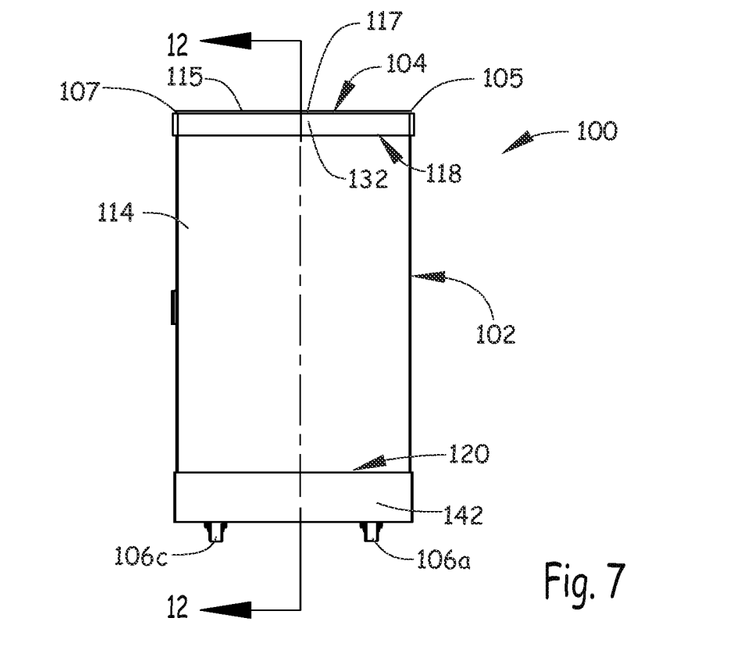
FIG. 7 is a left side view of the mobile cart illustrated in FIG. 1.
Figure 8:
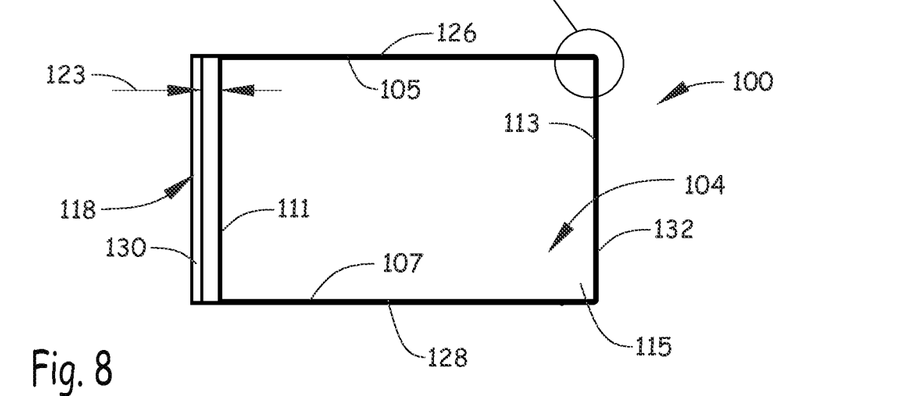
FIG. 8 is a top view of the mobile cart illustrated in FIG. 1.
Figure 9:
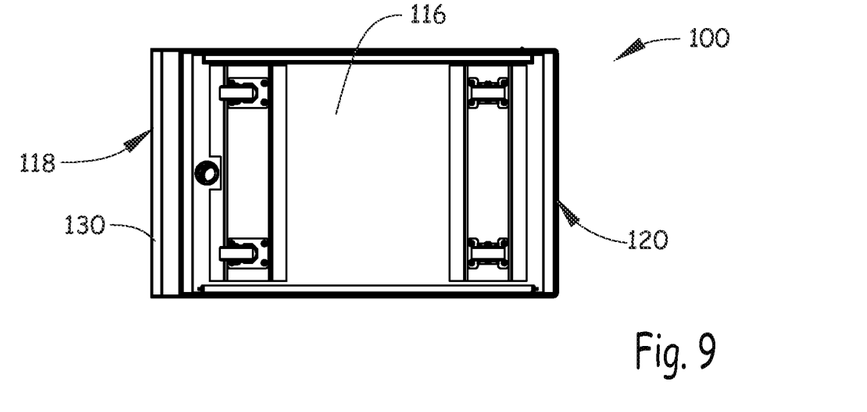
FIG. 9 is a bottom view of the mobile cart illustrated in FIG. 1.
Figure 10:
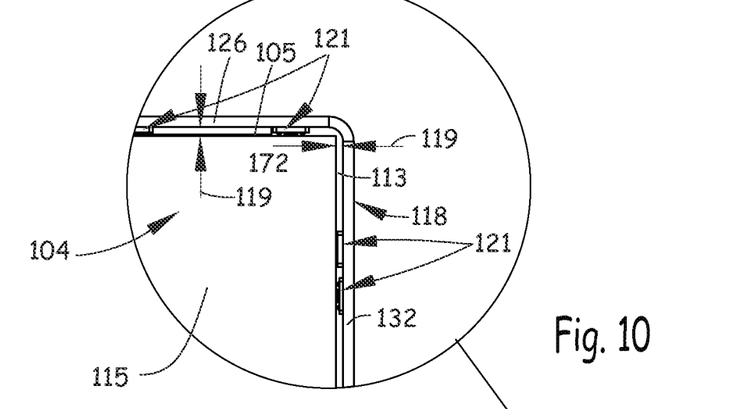
FIG. 10 is a partial enlarged view of FIG. 8.
Figure 11:
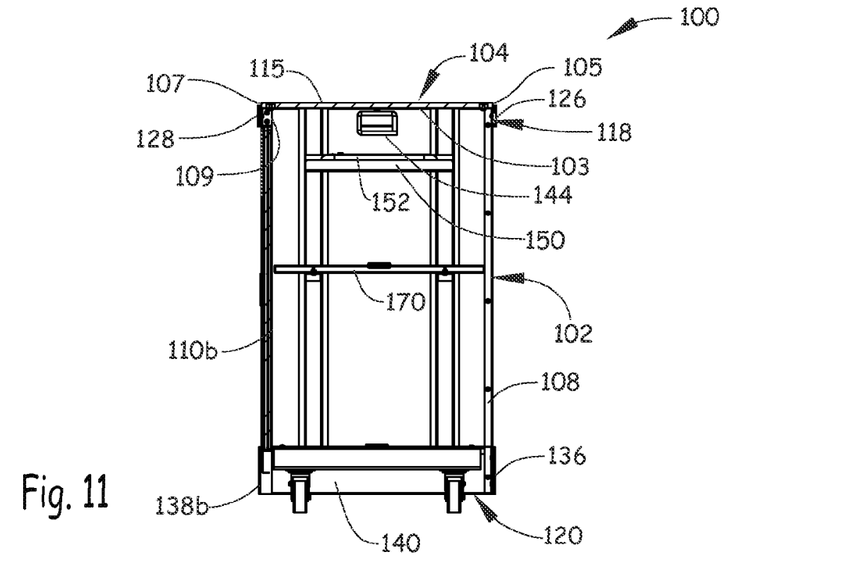
FIG. 11 is a section view of the mobile cart taken through the line indicated in FIG. 5.
Figures 12, 13:
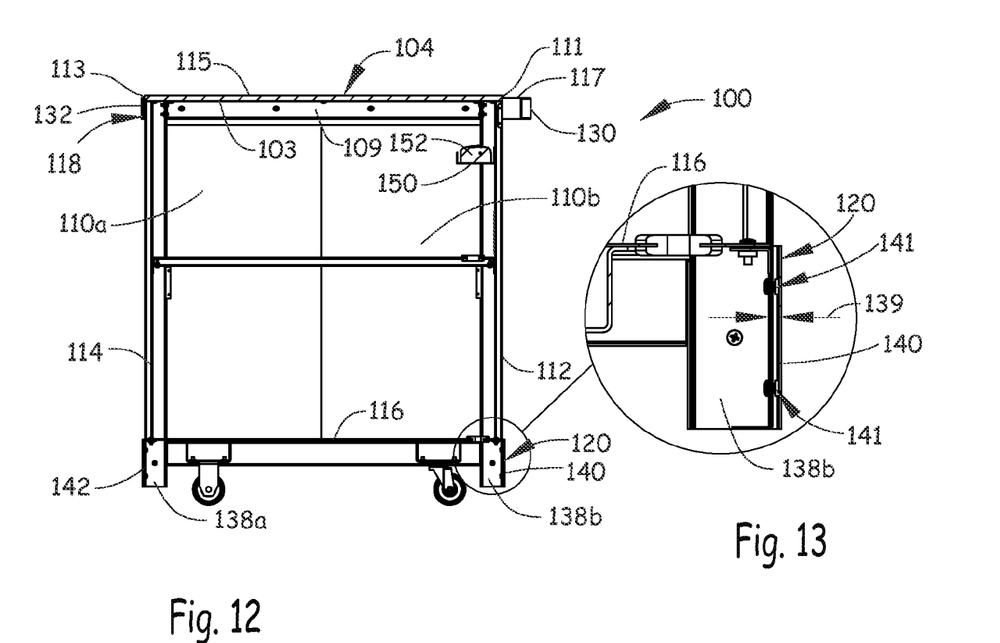
FIG. 12 is a section view of the mobile cart taken through the line indicated in FIG. 7.
FIG. 13 is a partial enlarged view of FIG. 12.

FIG. 1 is a front perspective view of a mobile cart 100, FIG. 2 is a back perspective view of mobile cart 100 and FIG. 3 is an exploded view of mobile cart 100 according to one embodiment. A front view, a back view, a right side view, a left side view, a top view and a bottom view of mobile cart 100 are illustrated in FIGS. 4-9. FIG. 10 illustrates a partial enlarged view of FIG. 8. FIG. 11 illustrates a section view of mobile cart 100 taken through the line indicated in FIG. 5 and FIG. 12 illustrates a section view of mobile cart 100 taken through the line indicated in FIG. 7. FIG. 13 illustrates a partial enlarged view of FIG. 12.

Mobile cart 100 is made of a material, such as metal, that provides sufficient strength for transporting utensils and appliances stored in mobile cart 100. Mobile cart 100 includes a cabinet or housing 102, a countertop or top 104 located on top of cabinet 102 and a plurality of wheels 106a, 106b, 106c and 106d. Countertop 104 can be made of a solid surface material, such as Corian® made by DuPont®. Wheels 106a, 106b, 106c and 106d are coupled to bottom or bottom panel 116 and support cabinet 102, items placed in cabinet 102 and countertop 104 and provide cart 100 with mobility. Cabinet 102 includes a front or front panel 108, a back, a first side or first side panel 112, an opposing second side or second side panel 114 and a bottom or bottom panel 116. As illustrated in FIGS. 1-12, the back of cabinet 102 includes an upper cross bar 109 (FIGS. 3, 5, 11 and 12) and at least one back panel 110a and 110b. The at least on back panel 110a and 110b are slidable door panels 110a and 110b that are mounted to a bottom of upper cross bar 109 and to bottom 116 on tracks. Door panels 110a and 110b can be made of a different type of material than the rest of cabinet 102 including, for example, plastic, wood or glass.

Countertop 104 includes a bottom surface 103 (FIGS. 11 and 12) coupled to tops of front panel 108, upper cross bar 109 on the back of cabinet 102, first side panel 112 and second side panel 114. A front edge 105, a back edge 107, a first side edge 111 and a second side edge 113 of countertop 104 do not extend outwardly from the outer surfaces of cabinet 102. Rather, front edge 105 is in alignment with the outer surface of front panel 108, back edge 107 is in alignment with the outer surface of upper cross bar 109, first side edge 111 is in alignment with the outer surface of first side panel 112 and second side edge 113 is in alignment with the outer surface of second side panel 114. Top surface 115 of countertop 104, however, extends above an upper edge 117 of an upper trim assembly 118 as clearly illustrated in FIGS. 4-7 and FIGS. 11-12.

Upper trim assembly 118 completely surrounds an upper portion of cabinet or housing 102 and, as illustrated in FIGS. 1-12, upper trim assembly 118 completely surrounds at least a bottom portion of countertop 104 as shown in the section views in FIGS. 11 and 12. More specifically, an upper portion of cabinet 102 includes upper portions and upper ends of front or front panel 108, upper cross bar 109 of the back, first side panel 112 and opposing second side panel 114.

Upper trim assembly 118 includes a front member 126, a back member 128, a first side member 130 and a second side member 132. First side member 130 connects front member 126 to back member 128 on a first side of mobile cart 100. Second side member 132 connects front member 126 to back member 128 on a second side of mobile cart 100.

Upper trim assembly 118 is spaced apart from cabinet or housing 102 and countertop 104. In particular, front member 126 is spaced apart from front panel 108 and a front edge of countertop 104, back member 128 is spaced apart from upper cross bar 109 of the back and a back edge of countertop 104, first side member 130 is spaced apart from first side panel 112 and a first side edge of countertop 104 and second side member 132 is spaced apart from second side panel 114 and a second side edge of countertop 104.

As illustrated, not all of members 126, 128, 130 and 132 are separated from cabinet or housing 102 at spaces that are substantially the same distance. While front member 126 is spaced apart from front panel 108 and countertop 104, back member 128 is spaced apart from upper cross bar 109 and countertop 104 and second side member 132 is spaced apart from second side panel 114 and countertop 104 by substantially the same distance or space 119 (FIG. 10), first side member 130 is spaced apart from first side panel 112 by a space 123 (FIG. 8) that is greater than space 119. Space 123 allows first side member 130 to act as a handle for moving the mobile cart to a desired location. In addition and as illustrated in FIG. 10 and FIG. 12, front member 126, back member 128 and second side member 132 are mounted to cabinet or housing 102 by hardware 121. Hardware 121 allows front member 126, back member 128 and second side member 132 to be spaced outwardly from the outer surface of front panel 108, the outer surface of upper cross bar 109 and the outer surface of second side panel 114, but remain rigidly connected to front panel 108, upper cross bar 109 and second side panel 114. First side member 130 has no such hardware. First side member 130 is cantilevered from front member 126 and back member 128.

Mobile cart 100 further includes a lower trim assembly or toe kick assembly. Lower trim assembly 120 at least partially surrounds a lower portion of cabinet or housing 102 including lower portions and lower ends of front or front panel 108, first side panel 112 and opposing second side panel 114. Lower trim assembly 120 includes at least a front member 136, at least one back member 138a and 138b, a first side member 140 and a second side member 142. First side member 140 connects front member 136 to back member 138b on a first side of mobile cart 100. Second side member 142 connects front member 136 to back member 138a on a second side of mobile cart 100. Like upper trim assembly 118, lower trim assembly 120 is also spaced apart from cabinet or housing 102. In particular, front member 136 is spaced apart from the outer surface of front panel 108, first side member 140 is spaced apart from the outer surface of first side panel 112 and second side member 142 is spaced apart from the outer surface of second side panel 114. Front member 136, first side member 140 and second side member 142 are separated from cabinet or housing 102 by a space 139 (FIG. 13) and like upper trim assembly are connected to front panel 108, first side panel 112 and second side panel 114 through hardware 141 (FIG. 13) similar to hardware 121. Space 139 is substantially similar to space 119. Therefore, front member 136 of lower trim assembly 120 is spaced apart from cabinet 102 by a space that is substantially similar to the space that front member 126 of upper trim assembly 118 is spaced apart from cabinet 102. Likewise, second side member 142 of lower trim assembly 120 is spaced apart from cabinet 102 by space 139 that is substantially similar to space 119 that second side member 132 of upper trim assembly 118 is spaced apart from cabinet 102.

First side or first side panel 112 includes an aperture or hole 144. Hole 144 extends between an inner surface 146 of first side panel 112 and an outer surface 148 of first side panel 112. Hole 144 is located at least partially in horizontal alignment with first side member 130 of upper trim assembly 118 and receives electrical cord(s) from at least one appliance that rests on top of countertop 104. The at least one appliance prepares products to be sampled. A tray 150 is coupled to inner surface 146 of first side panel 112 and is located below and proximal to hole 144. A power strip 152 is supported by tray 150 and has a plurality of outlets. A power cord from the power strip extends through hole 172 in shelf 170 and hole 174 in bottom panel 116.

Figure 14:
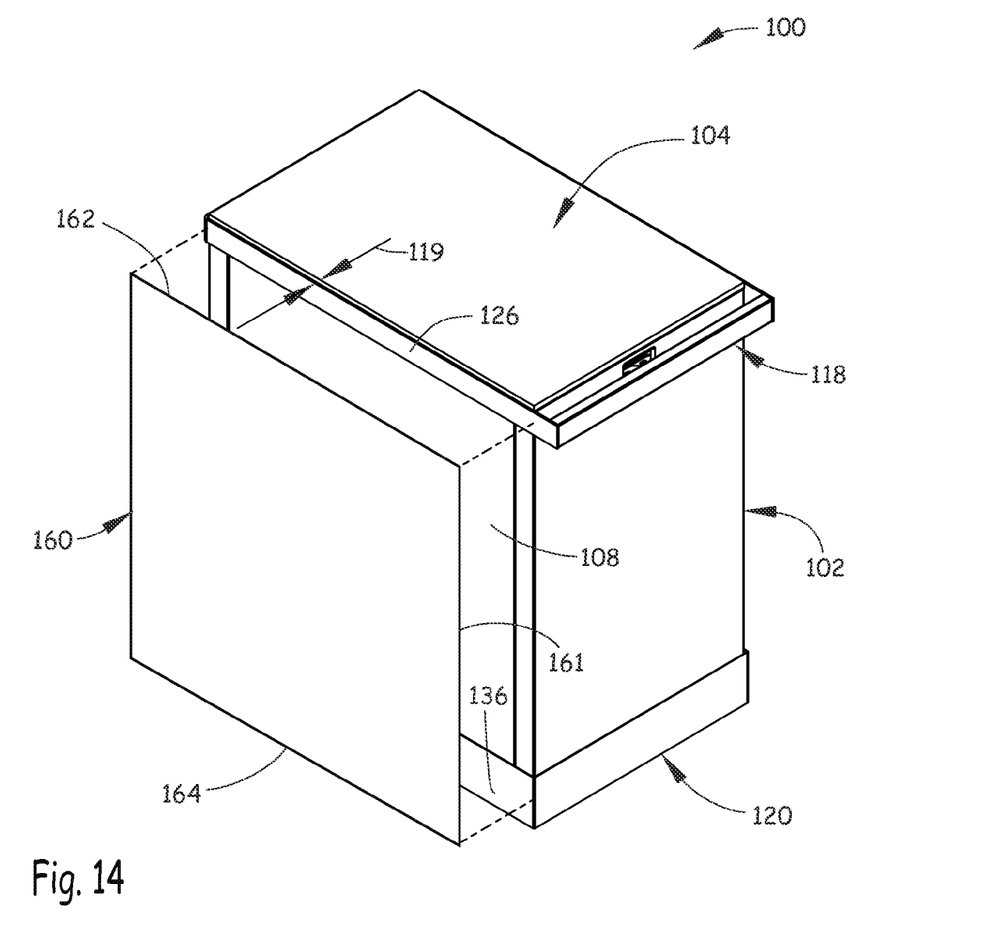
FIG. 14 is a front perspective view of the mobile cart of FIG. 1 with a marketing sign exploded from a front of the mobile cart.
Figure 15:
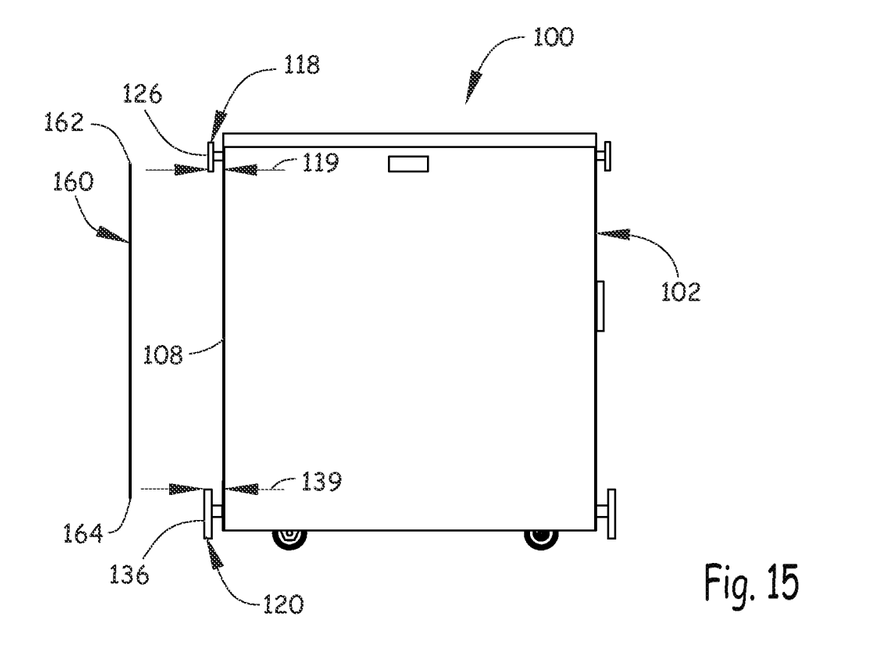
FIGS. 15-18 are right side schematic views of the mobile cart of FIG. 1 with the right side members of the upper trim assembly and the lower trim assembly removed for purposes of illustrating the placement of a marketing sign adjacent to a front of the cabinet.
Figure 16:
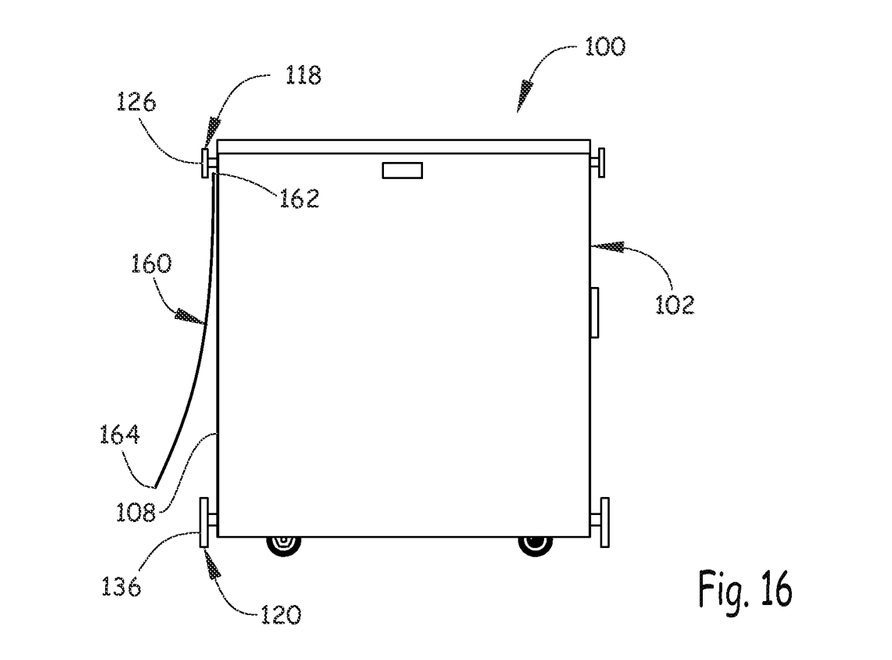
Figure 17:
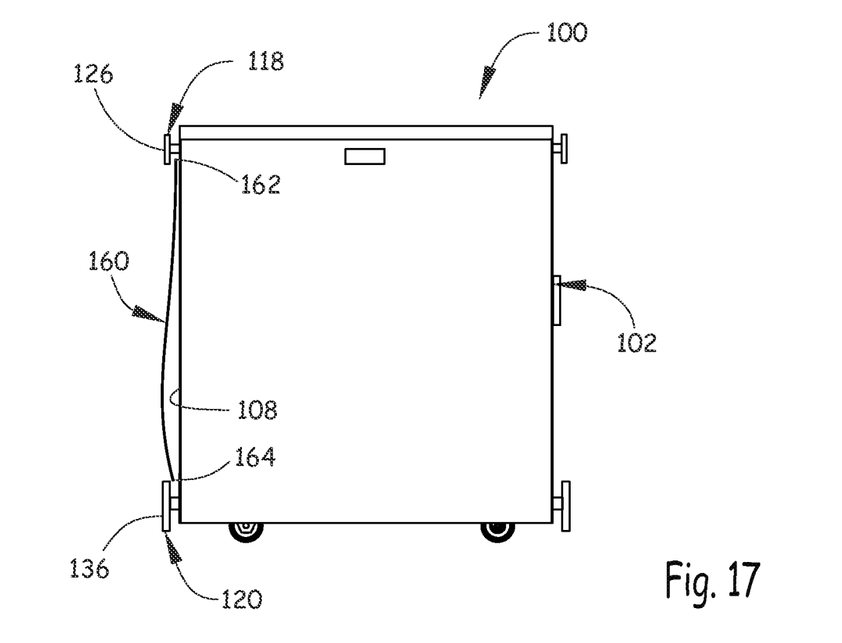
Figure 18:
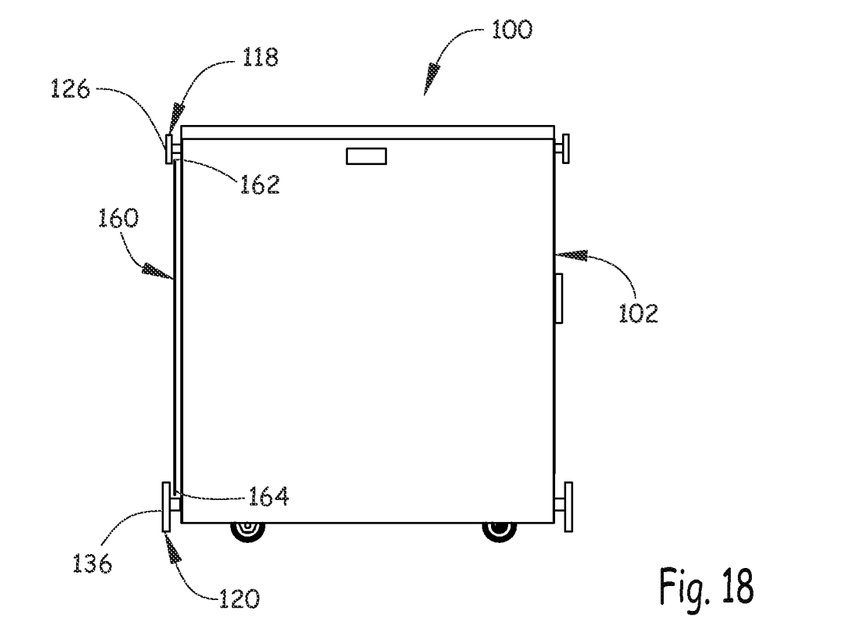
Figure 19:
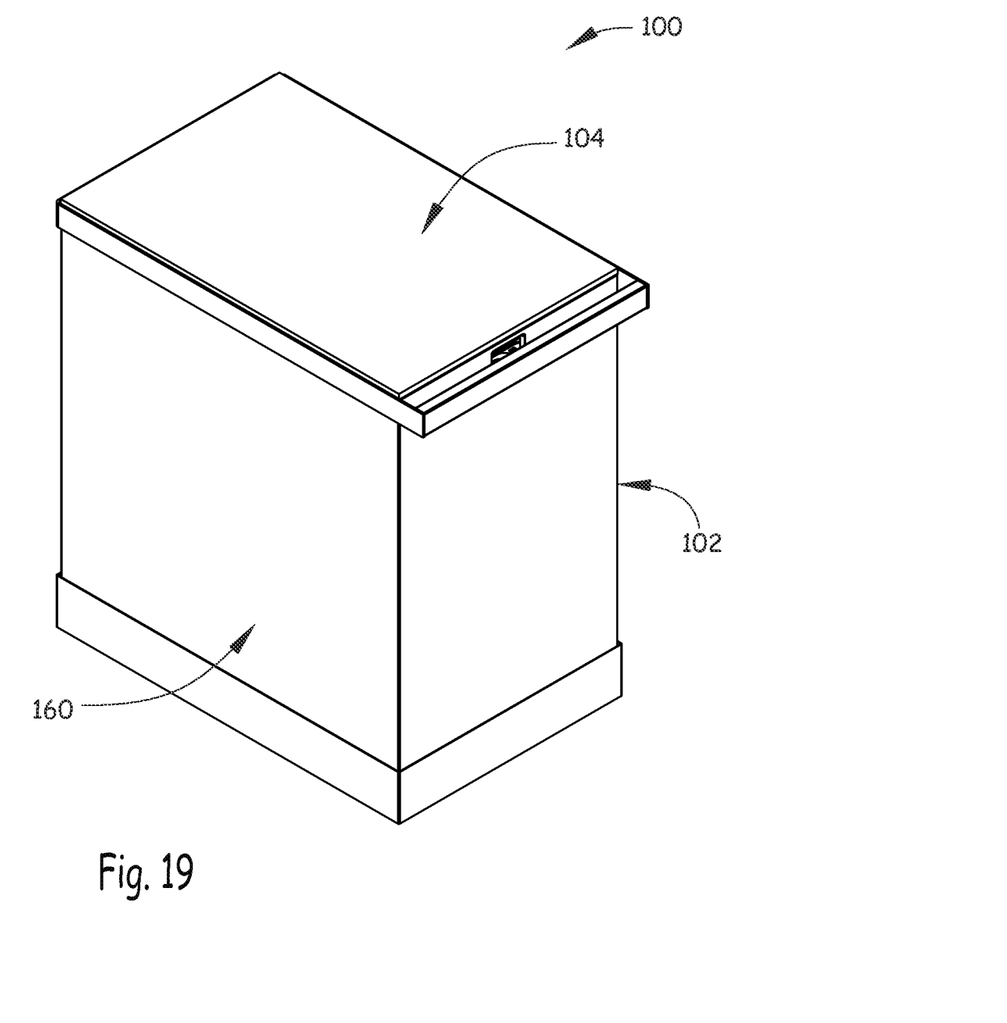
FIG. 19 is a front perspective view of the mobile cart of FIG. 1. with the marketing sign placed adjacent to the front of the mobile cart.

FIG. 14 illustrates a front perspective view of mobile cart 100 having a marketing sign 160 exploded from front panel 108. FIGS. 15-18 illustrate right side schematic views of mobile cart 100 with the right side member 130 of upper trim assembly 118 and right side member 140 of lower trim assembly 120 removed for purposes of illustrating the placement of marketing sign 160 adjacent to front 108 of cabinet 102. FIG. 19 illustrates a front perspective view of mobile cart 100 with marketing sign 160 mounted to, held against or otherwise placed adjacent to front panel 108.

As illustrated in FIGS. 16-19, an upper edge 162 of marketing sign 160 is located in space 119 between front member 126 of upper trim assembly 118 and front panel 108. Lower edge 164 of marketing sign 160 is located in space 139 between front member 136 of lower trim assembly 120 and front panel 108. In one embodiment, a magnet is located on a back side 161 of marketing sign 160 and holds marketing sign 160 to the ferromagnetic material in front panel 108 of cabinet 102. For example, the entire back side 161 of marketing sign 160 can be covered in magnetic material. In another embodiment and as illustrated in FIGS. 15-18, upper edge 162 is first flexed to be inserted in space 119 between front member 126 of upper trim assembly 118 and front panel 108. Second, lower edge 164 is flexed to be inserted in space 139 between front member 136 of lower trim assembly 120 and front panel 108. Therefore, upper edge 162 of marketing sign 160 is held to front panel 108 of cabinet 102 by residing between front member 126 and front panel 108. Lower edge 164 of marketing sign 160 is held to front panel 108 of cabinet 102 by residing between front member 136 and front panel 108. Not other fasteners or hardware are required.

Mobile cart 100 is deployed in a retail store or elsewhere by attaching marketing sign 160 to cabinet 102. As discussed above, marketing sign 160 is attached so that upper edge 162 is located in space 119 between front member 126 of upper trim assembly 118 and front panel 108 and lower edge 164 is located in space 139 between front member 136 of lower trim assembly 120 and front panel 108. Cabinet 102 is then moved to a desired location in the retail store for serving product samples to customers. Cabinet 102 is moved using first side member 130 of upper trim assembly 118 that is spaced apart from first side panel 112 of cabinet 102 by space 123.

At the desired location, one or more appliances that are stored on shelf 170 (FIGS. 3, 11 and 12) or on bottom panel 116 inside cabinet 102 are pulled out and set on top of countertop 104. Each appliance includes an electrical cord. The electrical cords are fed through or inserted through hole 144 in first side panel 112 and plugged into power strip 152 that is supported by tray 150. As previously discussed, tray 150 is mounted to or coupled to inner surface 146 of first side panel 112. An electrical cord connects to power strip 152 and passes through opening 172 in shelf 170 and opening 174 in bottom panel 116 and is plugged into an outlet to provide electrical power to mobile cart 100.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile cart comprising:
   a cabinet supported by a plurality of wheels;
   a countertop located on top of the cabinet;
   an upper trim assembly completely surrounding an upper portion of the cabinet and being spaced apart from the cabinet, wherein the upper trim assembly includes a front member, a back member, a first side member that connects the front member to the back member and a second side member that connects the front member to the back member, the first side member of the upper trim assembly is spaced apart from the cabinet by a space that is greater than a space between the front member of the upper trim assembly and the cabinet, a space between the back member of the upper trim assembly and the cabinet and a space between the second side member of the upper trim assembly and the cabinet;
   a lower trim assembly at least partially surrounding a lower portion of the cabinet and being spaced apart from the cabinet by a space; and
   a marketing sign held to a front panel of the cabinet, wherein an upper edge of the marketing sign is located in the space between the front member of the upper trim assembly and a front panel of the cabinet and the lower edge of the marketing sign is located in the space between a front member of the lower trim assembly and the front panel of the cabinet.

2. The mobile cart of claim 1, wherein the marketing sign further comprises a magnet located on a back side of the marketing sign that holds the marketing sign against the front panel of the cabinet.

3. The mobile cart of claim 1, wherein the upper trim assembly and the lower trim assembly are connected to the cabinet by hardware that holds the upper trim assembly and the lower trim assembly outwardly from outer surfaces of the cabinet.

4. The mobile cart of claim 1, wherein the first side member comprises a handle.

5. The mobile cart of claim 1, wherein the cabinet further comprises the front panel, at least one back panel, a first side panel and a second side panel, wherein the first side panel comprises a hole that extends between an inner surface of the first side panel and an outer surface of the first side panel, the hole receives at least one electrical cord from at least one appliance resting on top of the countertop.

6. The mobile cart of claim 5, wherein the hole is located at least partially in alignment with the first side member of the upper trim assembly.

7. The mobile cart of claim 5, further comprising:
   a tray coupled to the inner surface of the first side panel and being located below and proximal to the hole; and
   a power strip supported by the tray and having a plurality of power outlets.

8. A mobile cart comprising:
a housing including a front, a back, a bottom, a top, a first side and an opposing second side;
a set of wheels coupled to the bottom of the housing;
a frame assembly that surrounds an upper portion of the housing including upper portions of the front, the back, the first side and the opposing second side of the housing, wherein an upper edge of the frame assembly is located below a top surface of the top of the housing and the frame assembly comprises:
  a front member spaced apart from the front of the housing by a space;
  a back member spaced apart from the back of the housing by a space;
  a first side member spaced apart from the first side of the housing by a space and coupling the front member to the back member of the frame assembly;
  a second side member spaced apart from the second side of the housing by a space and coupling the front member to the back member of the frame assembly;
wherein the space between the first side member of the frame assembly and the first side of the housing is greater than the space between the second side member of the frame assembly and the second side of the housing; and
wherein the first side member of the frame assembly comprises a handle for moving the mobile cart to a desired location.

9. The mobile cart of claim 8, wherein the first side of the housing comprises an aperture that is located proximal to the top of the first side, the aperture being at least partially in horizontal alignment with the handle and receiving electrical cords from an appliance resting on the top of the cart frame.

10. The mobile cart of claim 8, further comprising:
a tray coupled to an inner surface of the first side of the housing and being located below and proximal to the aperture; and
a power strip supported by the tray and having a plurality of power outlets.

11. The mobile cart of claim 8, further comprising a toe kick assembly that at least partially surrounds a lower portion of the housing including lower portions of the front, the first side and the second side of the housing, the toe kick assembly comprising:
  a front member spaced apart from the front of the housing;
  a first side member spaced apart from the first side of the housing; and
  a second side member spaced apart from the second side of the housing.

12. The mobile cart of claim 11, wherein the front member of the toe kick assembly is spaced apart from the front of the housing by a space that is substantially similar to the space that the front member of the frame assembly is spaced apart from the front of the housing.

13. The mobile cart of claim 12, further comprising a sign having an upper edge and a lower edge and being held adjacent to an outer surface of the front of the housing, wherein the upper edge of the sign is located in the space between the front member of the frame assembly and the front of the housing and the lower edge of the sign is located in the space between the front member of the toe kick assembly and the front of the housing.

14. The mobile cart of claim 13, wherein the sign is magnetically held to the outer surface of the front of the housing.

15. A mobile cart comprising:
a cabinet supported by a plurality of wheels and having a front panel and a side panel;
a countertop located above the cabinet and supported by the cabinet;
a lower trim assembly having a front member that is separated from the front panel of the cabinet by a space;
an upper trim assembly having a front member and a side member, wherein the front member is separated from the front panel of the cabinet by a space and wherein the side member is separated from the side panel of the cabinet by a space that is greater than the space between the front member of the upper trim assembly and the front panel and the space between the front member of the lower trim assembly and the front panel; and
a marketing sign placed adjacent to the front panel of the cabinet, wherein an upper edge of the marketing sign is located in the space between the front member of the upper trim assembly and the front panel of the cabinet and a lower edge of the marketing sign is located in the space between a front member of the lower trim assembly and the front panel of the cabinet.

16. The mobile cart of claim 15, further comprising a power strip that is held on a tray that is coupled to an inner surface of a panel of the cabinet, wherein a cord of an appliance is inserted through an aperture in the panel that is located above and proximal to the tray.

17. The method of claim 15, wherein the marketing sign is magnetically attached to the front panel of the cabinet.

18. The mobile cart of claim 15, wherein the upper trim assembly and the lower trim assembly are connected to the cabinet by hardware that holds the upper trim assembly and the lower trim assembly outwardly from outer surfaces of the cabinet to create the spaces.

19. The mobile cart of claim 15, wherein the side member of the upper trim assembly comprises a handle for moving the mobile cart.

* * * * *